(12) United States Patent
Wright et al.

(10) Patent No.: US 12,313,030 B2
(45) Date of Patent: May 27, 2025

(54) JOINTED WIND TURBINE ROTOR BLADE WITH CHORD-WISE EXTENDING PIN BUSHINGS DESIGNED TO MINIMIZE CHORD-WISE GAP

(71) Applicant: General Electric Company, Schenectady, NY (US)

(72) Inventors: Jon Stuart Wright, Greenville, SC (US); Andrew Mitchell Rodwell, Greenville, SC (US); Scott Jacob Huth, Greenville, SC (US); Scott Iverson Shillig, Greenville, SC (US); Rohit Agarwal, Simpsonville, SC (US); Ashley Simone Wilford, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 333 days.

(21) Appl. No.: 17/435,238

(22) PCT Filed: Feb. 27, 2020

(86) PCT No.: PCT/US2020/020097
§ 371 (c)(1),
(2) Date: Aug. 31, 2021

(87) PCT Pub. No.: WO2020/180601
PCT Pub. Date: Sep. 10, 2020

(65) Prior Publication Data
US 2022/0178346 A1    Jun. 9, 2022

(51) Int. Cl.
*F03D 1/06*    (2006.01)

(52) U.S. Cl.
CPC ...... *F03D 1/0675* (2013.01); *F05B 2230/604* (2013.01); *F05B 2240/301* (2013.01); *F05B 2240/302* (2013.01); *F05B 2240/31* (2013.01)

(58) Field of Classification Search
CPC ...... F03D 1/0675; F03D 1/0683; F16B 21/12; F16B 21/14; B23P 15/04; F05B 2230/604;
(Continued)

(56) References Cited

U.S. PATENT DOCUMENTS

| 851,196 A | 4/1907 | Bevans et al. |
| 2,683,380 A * | 7/1954 | Hutton ...................... F16D 3/50 464/71 |

(Continued)

FOREIGN PATENT DOCUMENTS

| CN | 101463795 A | 6/2009 |
| CN | 101932828 A | 12/2010 |

(Continued)

OTHER PUBLICATIONS

The Engineering ToolBox (2004). Friction—Friction Coefficients and Calculator. [online] Available at: https://www.engineeringtoolbox.com/friction-coefficients-d_778.html [Accessed Aug. 17, 2023]. (Year: 2004).*

(Continued)

*Primary Examiner* — Courtney D Heinle
*Assistant Examiner* — Ryan C Clark
(74) *Attorney, Agent, or Firm* — Dority & Manning, P.A.

(57) ABSTRACT

A rotor blade includes first and second blade segments extending in opposite directions from a chord-wise joint. The first blade segment includes a beam structure that connects with the second blade segment via a receiving section. A chord-wise gap exists between an edge of the beam structure and an edge of the receiving section. The beam structure defines a first pin joint slot, whereas the receiving section defines a second pin joint slot that aligns with the first pin joint slot. First and second bushings are arranged in first ends of the first and second pin joint slots, (Continued)

each having a flange extending within the chord-wise gap. As such, the flanges abut against each other within the chord-wise gap so as to fill the chord-wise gap with a predetermined defined gap or interference. Further, a chord-wise extending pin is positioned through the bushings so as to secure the first and second blade segments together.

17 Claims, 8 Drawing Sheets

(58) Field of Classification Search
CPC ......... F05B 2240/301; F05B 2240/302; F05B 2240/31; F05B 2240/307; F05B 2260/30; Y10T 403/55; Y10T 29/49336; Y10T 29/49947
See application file for complete search history.

(56) References Cited

U.S. PATENT DOCUMENTS

| | | | |
|---|---|---|---|
| 3,713,753 A * | 1/1973 | Brunsch | B29C 70/545 416/241 A |
| 4,474,536 A | 10/1984 | Gougeon et al. | |
| 4,643,646 A | 2/1987 | Hahn et al. | |
| 4,732,542 A | 3/1988 | Hahn et al. | |
| 5,281,454 A | 1/1994 | Hanson | |
| 6,843,953 B2 | 1/2005 | Filsinger et al. | |
| 7,334,989 B2 | 2/2008 | Arelt | |
| 7,344,360 B2 | 3/2008 | Wetzel | |
| 7,654,799 B2 * | 2/2010 | Eyb | F03D 1/0675 416/232 |
| 7,901,188 B2 * | 3/2011 | Llorente Gonzalez | F03D 1/0675 416/223 R |
| 7,922,454 B1 | 4/2011 | Riddell | |
| 7,927,077 B2 | 4/2011 | Olson | |
| 7,997,874 B2 | 8/2011 | van der Bos | |
| 7,998,303 B2 | 8/2011 | Bachmann et al. | |
| 8,123,488 B2 | 2/2012 | Finnigan et al. | |
| 8,297,932 B2 | 10/2012 | Arocena De La Rua et al. | |
| 8,348,622 B2 | 1/2013 | Bech | |
| 8,356,982 B2 | 1/2013 | Petri Larrea et al. | |
| 8,376,713 B2 | 2/2013 | Kawasetsu et al. | |
| 8,388,316 B2 | 3/2013 | Arocena De La Rua et al. | |
| 8,517,689 B2 | 8/2013 | Kyriakides et al. | |
| 8,919,754 B2 | 12/2014 | Schibsbye | |
| 9,669,589 B2 | 6/2017 | Zamora Rodriguez et al. | |
| 2007/0018049 A1 * | 1/2007 | Stuhr | B64C 23/069 244/124 |
| 2007/0253824 A1 | 11/2007 | Eyb | |
| 2009/0116962 A1 | 5/2009 | Pedersen et al. | |
| 2009/0155084 A1 | 6/2009 | Livingston et al. | |
| 2009/0162208 A1 | 6/2009 | Zirin et al. | |
| 2010/0003141 A1 * | 1/2010 | Hancock | B29D 99/0028 416/223 R |
| 2010/0132884 A1 | 6/2010 | Bachmann et al. | |
| 2010/0215494 A1 | 8/2010 | Bech et al. | |
| 2010/0304170 A1 | 12/2010 | Frederiksen | |
| 2011/0020126 A1 * | 1/2011 | Glenn | F03D 80/00 416/223 A |
| 2011/0052403 A1 * | 3/2011 | Kawasetsu | F03D 1/0675 416/226 |
| 2011/0081247 A1 | 4/2011 | Hibbard | |
| 2011/0081248 A1 | 4/2011 | Hibbard | |
| 2011/0091326 A1 * | 4/2011 | Hancock | F03D 1/0675 29/889.7 |
| 2011/0158788 A1 * | 6/2011 | Bech | F03D 1/0675 29/889.7 |
| 2011/0158806 A1 | 6/2011 | Arms et al. | |
| 2011/0229336 A1 | 9/2011 | Richter et al. | |
| 2012/0093627 A1 | 4/2012 | Christenson et al. | |
| 2012/0196079 A1 | 8/2012 | Brauers et al. | |
| 2012/0213642 A1 | 8/2012 | Wang | |
| 2012/0269643 A1 | 10/2012 | Hibbard et al. | |
| 2012/0282094 A1 * | 11/2012 | Gay | F03D 7/0228 416/147 |
| 2012/0308396 A1 | 12/2012 | Hibbard | |
| 2013/0040151 A1 | 2/2013 | Jeromerajan et al. | |
| 2013/0064663 A1 | 3/2013 | Loth et al. | |
| 2013/0129518 A1 | 5/2013 | Hayden et al. | |
| 2013/0164133 A1 | 7/2013 | Grove-Nielsen | |
| 2013/0177433 A1 | 7/2013 | Fritz et al. | |
| 2013/0189112 A1 | 7/2013 | Hedges et al. | |
| 2013/0189114 A1 | 7/2013 | Jenzewski et al. | |
| 2013/0219718 A1 | 8/2013 | Busbey et al. | |
| 2013/0224032 A1 | 8/2013 | Busbey et al. | |
| 2013/0236307 A1 | 9/2013 | Stege | |
| 2013/0236321 A1 | 9/2013 | Olthoff | |
| 2014/0286780 A1 * | 9/2014 | Lemos | F03D 1/0633 29/889.71 |
| 2015/0204200 A1 | 7/2015 | Eyb et al. | |
| 2015/0369211 A1 * | 12/2015 | Merzhaeuser | F03D 80/30 416/61 |
| 2018/0051672 A1 * | 2/2018 | Merzhaeuser | F03D 13/10 |
| 2018/0340510 A1 * | 11/2018 | Huth | F03D 1/0675 |

FOREIGN PATENT DOCUMENTS

| | | |
|---|---|---|
| CN | 105298739 A | 2/2016 |
| DE | 102016123346 B3 | 12/2017 |
| EP | 2186622 A1 | 5/2010 |
| EP | 3144526 A1 | 3/2017 |
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |

OTHER PUBLICATIONS

Chinese Office Action, Mar. 27, 2024.
International Search Report and Opinion Corresponding to PCT/US2020/020097 on May 15, 2020.

* cited by examiner

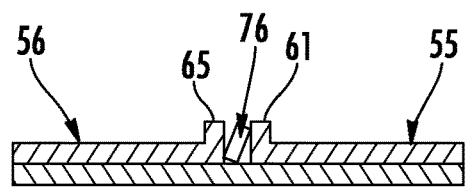
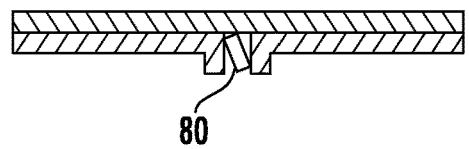
FIG. 10
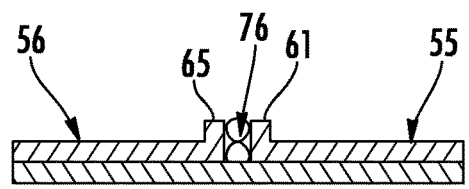
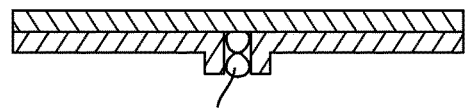
FIG. 11
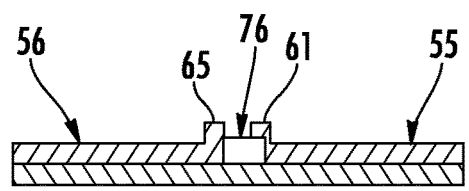
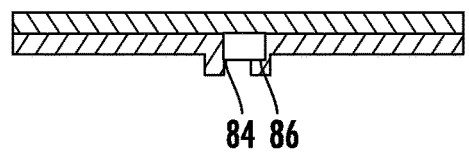
FIG. 12

JOINTED WIND TURBINE ROTOR BLADE WITH CHORD-WISE EXTENDING PIN BUSHINGS DESIGNED TO MINIMIZE CHORD-WISE GAP

FIELD

The present disclosure relates generally to wind turbines, and more particularly to a jointed wind rotor blade having chord-wise extending pin bushings designed to eliminate chord-wise gaps between joined blade segments.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

As wind turbines continue to increase in size, the rotor blades also increase in size. Thus, larger rotor blades may be constructed in segments that can be assembled on site via one or more pin joints. Increasing the blade length requires additional blade support, because gravity pulls along the increased length to create a larger bending moment than in shorter rotor blades. The pin joints are configured to allow the blade tip to flex to withstand some of this load.

Such pin joints typically include a beam structure of a first blade segment received within a receiving section of a second blade segment, with a chord-wise extending pin extending through first and second pin joint slots of the beam structure and the receiving section, respectively, so join the first and second segments together. Oftentimes, there is a chord-wise gap at the leading edge and the trailing edge of such pin joints between the beam structure and the receiving section as the beam structure is often narrower than the receiving section. Minimizing this gap is beneficial to the performance of the pin joint. For example, minimizing the gap provides a continuous load path, structural efficiency, and minimized translation in the chord-wise direction, which also minimizes wear.

Accordingly, the present disclosure is directed to jointed wind rotor blades having chord-wise extending pin bushings designed to eliminate chord-wise gaps between joined blade segments.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments includes at least one shell member defining an airfoil surface and an internal support structure. The first blade segment includes a beam structure extending lengthwise that structurally connects with the second blade segment via a receiving section. The rotor blade also includes at least one chord-wise gap between an edge of the beam structure and an edge of the receiving section. The beam structure defines a first pin joint slot, whereas the receiving section defining a second pin joint slot that aligns with the first pin joint slot. The rotor blade further includes a first bushing arranged in a first end of the first pin joint slot. The first bushing includes a flange extending within the chord-wise gap and surrounding the first end of the first pin joint slot. The rotor blade also includes a second bushing arranged in a first end of the second pin joint slot. The second bushing also has a flange extending within the chord-wise gap and surrounding the first end of the second pin joint slot. Further, the flanges of the bushings abut against each other with the chord-wise gap so as to fill the chord-wise gap with a predetermined defined gap or interference. As such, the flanges are configured to partially fill the chord-wise gap so as to define a precisely-defined gap or interference or may be designed to completely fill the chord-wise gap. Moreover, the rotor blade includes at least one chord-wise extending pin positioned through the first and second bushings of the first and second pin joint slots so as to secure the first and second blade segments together.

In one embodiment, the rotor blade may further include a pair of first bushings arranged in the first end of the first pin joint slot and an opposing, second opening of the first pin joint slot, respectively, and a pair of second bushings arranged in the first end of the second pint joint slot and an opposing, second opening of the second pin joint slot, respectively. In such embodiments, the chord-wise extending pin is positioned through the pairs of first and second bushings of the first and second pin joint slots so as to secure the first and second blade segments together.

In another embodiment, the chord-wise gap is located adjacent to a trailing edge and/or a leading edge of the rotor blade.

In further embodiments, a chord-wise width of the abutting flanges is greater than a chord-wise width of the chord-wise gap so as create the interference fit. For example, in such embodiments, the chord-wise width of the abutting flanges is greater than the chord-wise width of the chord-wise gap by about 1.5 millimeters (mm). In several embodiments, the first and second bushings may further include a coating material, e.g. having a coefficient of friction of less than about 0.2.

In additional embodiments, the first and second bushings are constructed of a metal or metal alloy. Thus, in such embodiments, the metal or metal alloy may include a material tolerance of about +/−0.025 millimeters (mm) over a 1000 mm span.

In another aspect, the present disclosure is directed to a method for assembling a rotor blade. The method includes forming a first blade segment and a second blade segment via a molding process. Each of the first and second blade segments have at least one shell member defining an airfoil surface and an internal support structure. The first blade segment has a beam structure extending lengthwise, whereas the second blade segment having via a receiving section. The method also includes determining a size of at least one chord-wise gap between an edge of the beam structure and an edge of the receiving section when the beam structure is received within the receiving section. Further, the method includes providing a first pair of metal bushings in opposing ends of a first pin joint slot of the beam structure. Each of the first pair of metal bushings has a flange. Moreover, the method includes providing a second pair of metal bushings in opposing ends of a second pin joint slot of the receiving section, each of the second pair of metal bushings comprising a flange. In addition, the method includes positioning one of the flanges from the first pair of metal bushings with one of the flanges from the second pair of metal bushings such that the flanges abut against each other within the chord-wise gap so as to fill the chord-wise gap with a predetermined defined gap or interference. The method further includes placing the first and second blade segments in opposite directions from a chord-wise joint. In addition, the method includes inserting the beam structure into the receiving section such that the first pin joint slot of the beam structure aligns with the second pin joint slot of the receiving section. Further, the method includes inserting at least one chord-wise extending pin through the first and second pairs of bushings within the first and second pin joint slots so as to secure the first and second blade segments together.

In one embodiment, the method further includes determining the size of the chord-wise gap between the edge of the beam structure and the edge of the receiving section when the beam structure is received within the receiving section after the molding process is complete and then machining the plurality of flanges of the plurality of metal bushings to remove an interference thereof that is larger than the chord-wise gap.

In another embodiment, providing the first pair of metal bushings in opposing ends of the first pin joint slot and providing the second pair of metal bushings in opposing ends of the second pin joint slot of the receiving section may further include infusing the first and second pairs of metal bushings in the first and second pin joint slots, respectively, such that, when the beam structure is inserted into the receiving section, the flanges of the first and second pairs of metal bushings completely fill the chord-wise gap.

In another aspect, the present disclosure is directed to a rotor blade for a wind turbine. The rotor blade includes a first blade segment and a second blade segment extending in opposite directions from a chord-wise joint. Each of the first and second blade segments includes at least one shell member defining an airfoil surface and an internal support structure. The first blade segment includes a beam structure extending lengthwise that structurally connects with the second blade segment via a receiving section. The rotor blade also includes at least one chord-wise gap between an edge of the beam structure and an edge of the receiving section. The beam structure defines a first pin joint slot, whereas the receiving section defining a second pin joint slot that aligns with the first pin joint slot. The rotor blade further includes a first bushing arranged in a first end of the first pin joint slot. The first bushing includes a flange extending within the chord-wise gap and surrounding the first end of the first pin joint slot. The rotor blade also includes a second bushing arranged in a first end of the second pin joint slot. The second bushing also has a flange extending within the chord-wise gap and surrounding the first end of the second pin joint slot. Further, the rotor blade also includes at least one spacer component adjacent to one or more of the flanges of the bushings within the chord-wise gap. In addition, the rotor blade includes at least one chord-wise extending pin positioned through the first and second bushings of the first and second pin joint slots so as to secure the first and second blade segments together.

In one embodiment, a chord-wise width of the abutting flanges is less than a width of the chord-wise gap. In another embodiment, the spacer component(s) may include one or more shims. In such embodiments, the shim(s) are configured to fill the remainder of the gap not filled by the abutting flanges. As such, the shim(s) and the flanges completely fill the chord-wise gap.

In further embodiments, the spacer component(s) may include one or more spring-loaded devices. In such embodiments, the spring-loaded devices may include a conical disk spring, a multilayer wave disk spring, or a rubber viscoelastic ring. In one embodiment, where the spring-loaded device(s) correspond to the rubber viscoelastic ring, at least a portion of the rubber viscoelastic ring sits within a recess of at least one of the flanges of the first and second bushings. In addition, a spring rate of the rubber viscoelastic ring becomes nonlinear over a predetermined time period such that the rubber viscoelastic ring becomes stiff after the predetermined time period.

In additional embodiments, the spacer component(s) may be constructed of a metal or metal alloy. As such, the metal or metal alloy generally has a tight material tolerance of about +/−0.025 millimeters (mm) per 1000 mm.

In certain embodiments, the spacer component(s) may be positioned between the flanges of the first and second bushings. Alternatively, the spacer component(s) may be arranged around a shaft of one of the first or second bushings.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 illustrates a cross-sectional view of abutting flanges of a chord-wise joint of a rotor blade with a conical disk spring arranged therebetween according to the present disclosure;

FIG. 11 illustrates a cross-sectional view of abutting flanges of a chord-wise joint of a rotor blade with a multi-layer wave disk spring arranged therebetween according to the present disclosure;

FIG. 12 illustrates a cross-sectional view of abutting flanges of a chord-wise joint of a rotor blade with a rubber viscoelastic ring arranged therebetween according to the present disclosure.

DETAILED DESCRIPTION

Figure 1:
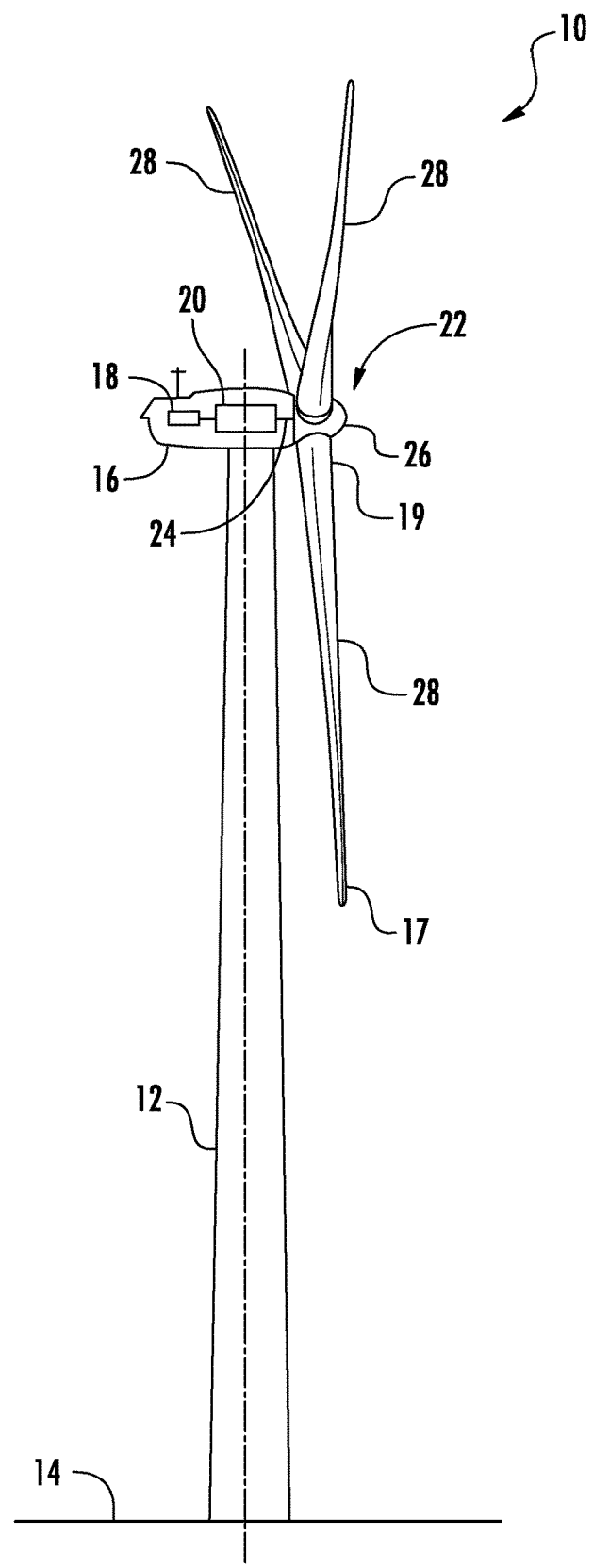
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
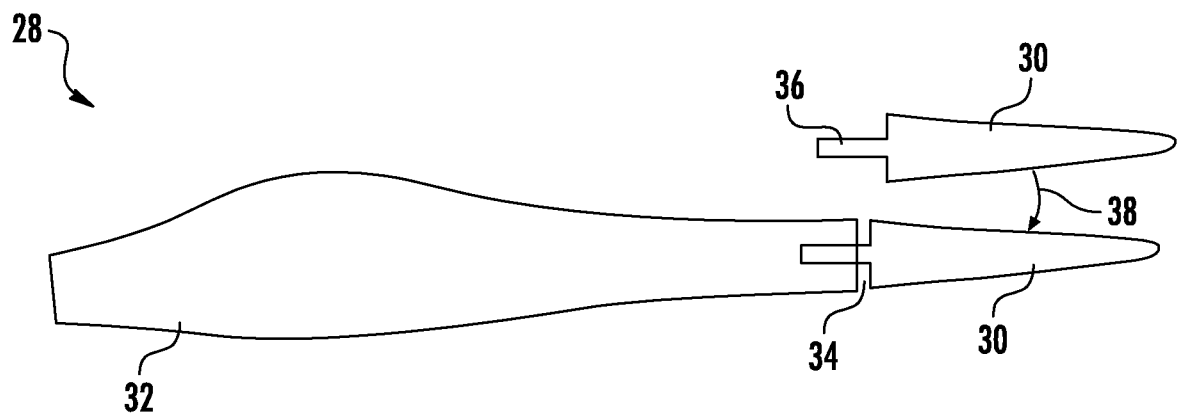
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include at least one shell member, such as a pressure side shell member, a suction side shell member, a leading edge shell member, a trailing edge shell member and so on. Further, as shown, the first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32.

Figure 3:
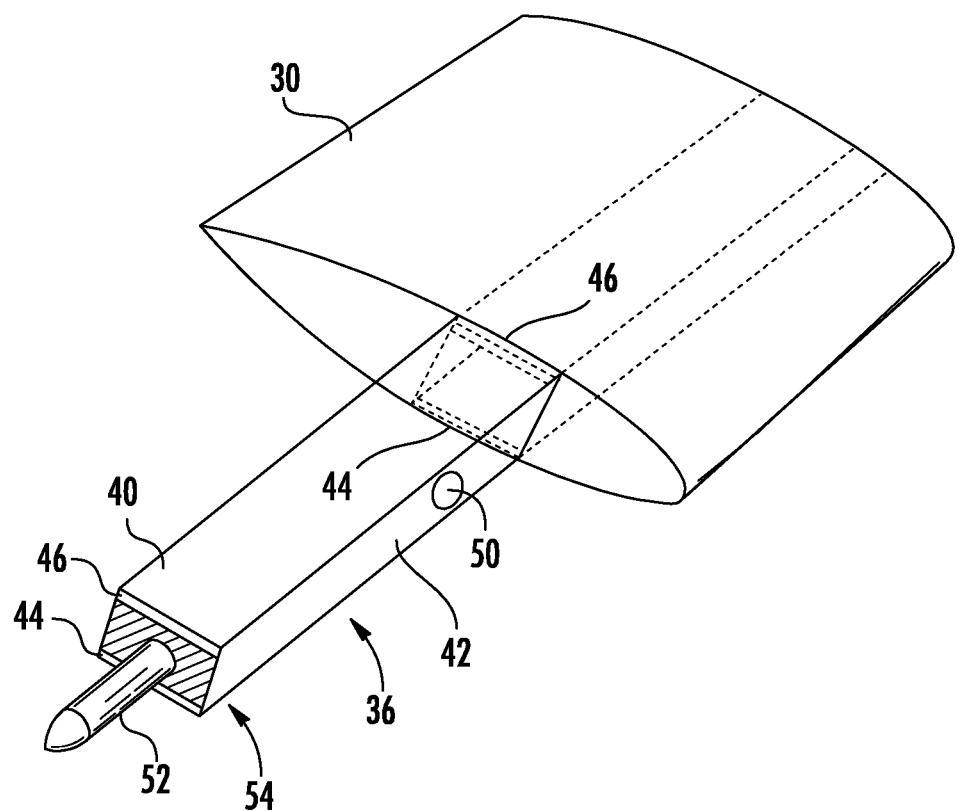
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms at least a part of a shear web 42 connected with a suction side spar cap 44 and a pressure side spar cap 46.

Moreover, as shown, the first blade segment 30 may include one or more pin joints 52 at a receiving end 54 of the beam structure 40. In one embodiment, for example, the pin joint 52 may include a pin in a tight interference fit with a bushing. More specifically, as shown, the pin 52 may be oriented in a span-wise direction, i.e. along the span or length of the rotor blade 28 which is defined along an axis that extends from the blade root 19 to the blade tip 17 of the rotor blade 28. Further, the first blade segment 30 may also include at least one first pin joint slot 50 located on the beam structure 40. Moreover, as shown, the first pin joint slot 50 may be oriented in a chord-wise direction, i.e. along a chord of the rotor blade 28 which is defined along an axis that extends from the leading edge to the trailing edge of the rotor blade 28.

Figure 4:
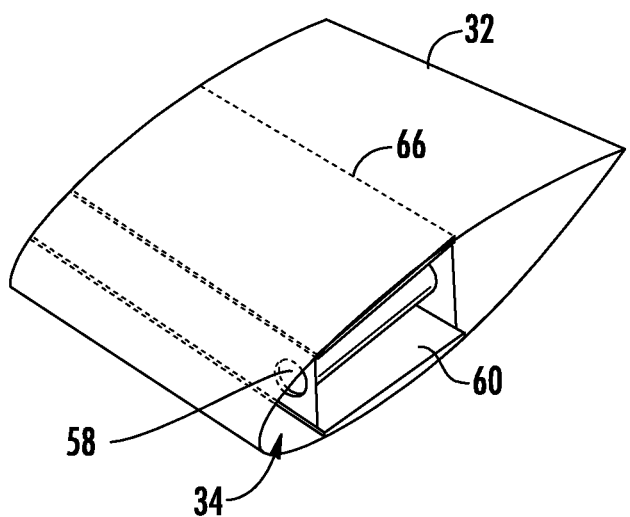
FIG. 4 illustrates a perspective view of one embodiment of a section of the second blade segment at the chord-wise joint according to the present disclosure.
Figure 5:
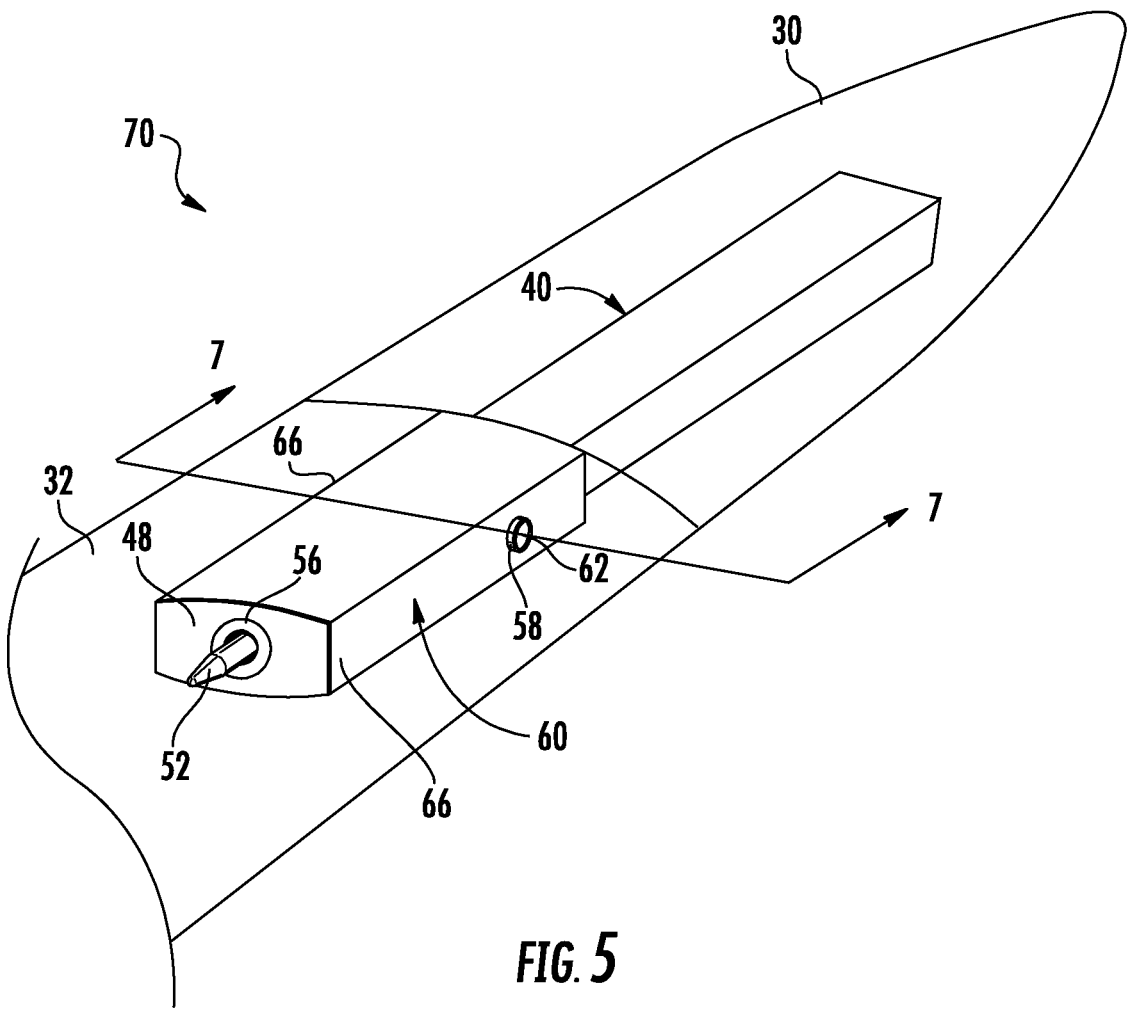
FIG. 5 illustrates a joint assembly of one embodiment of the rotor blade of the wind turbine having the first blade segment joined with the second blade segment according to the present disclosure.

Referring now to FIG. 4, a perspective view of a section of the second blade segment 32 according to the present disclosure is illustrated. As shown, the second blade segment 32 includes a receiving section 60 extending lengthwise within the second blade segment 32 for receiving the beam structure 40 of the first blade segment 30. Further, as shown, the receiving section 60 may include one or more spar structures 66 (similar to spar caps 44, 46) that extend lengthwise for connecting with the beam structure 40 of the first blade segment 30. In addition, as shown in FIG. 5, the receiving section 60 may include a chord-wise member 48 having a span-wise pin joint slot 56 defined therethrough for receiving the pin joint 52. Moreover, as shown, the receiving section 60 may include a chord-wise second pin joint slot 58 defined therethrough that aligns with the first pin joint slot 50 of the beam structure 40.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28. More specifically, as shown, the span-wise extending pin 52 of the receiving end 54 of the beam structure 40 is received within the span-wise pin joint slot 56 of the receiving section 60 so as to secure the first and second blade segments 30, 32 together. In addition, as shown, the first and second pin joint slots 50, 58 are aligned and a chord-wise extending pin 62 is secured therethrough so as to secure the first and second blade segments 30, 32 together.

Figure 6:
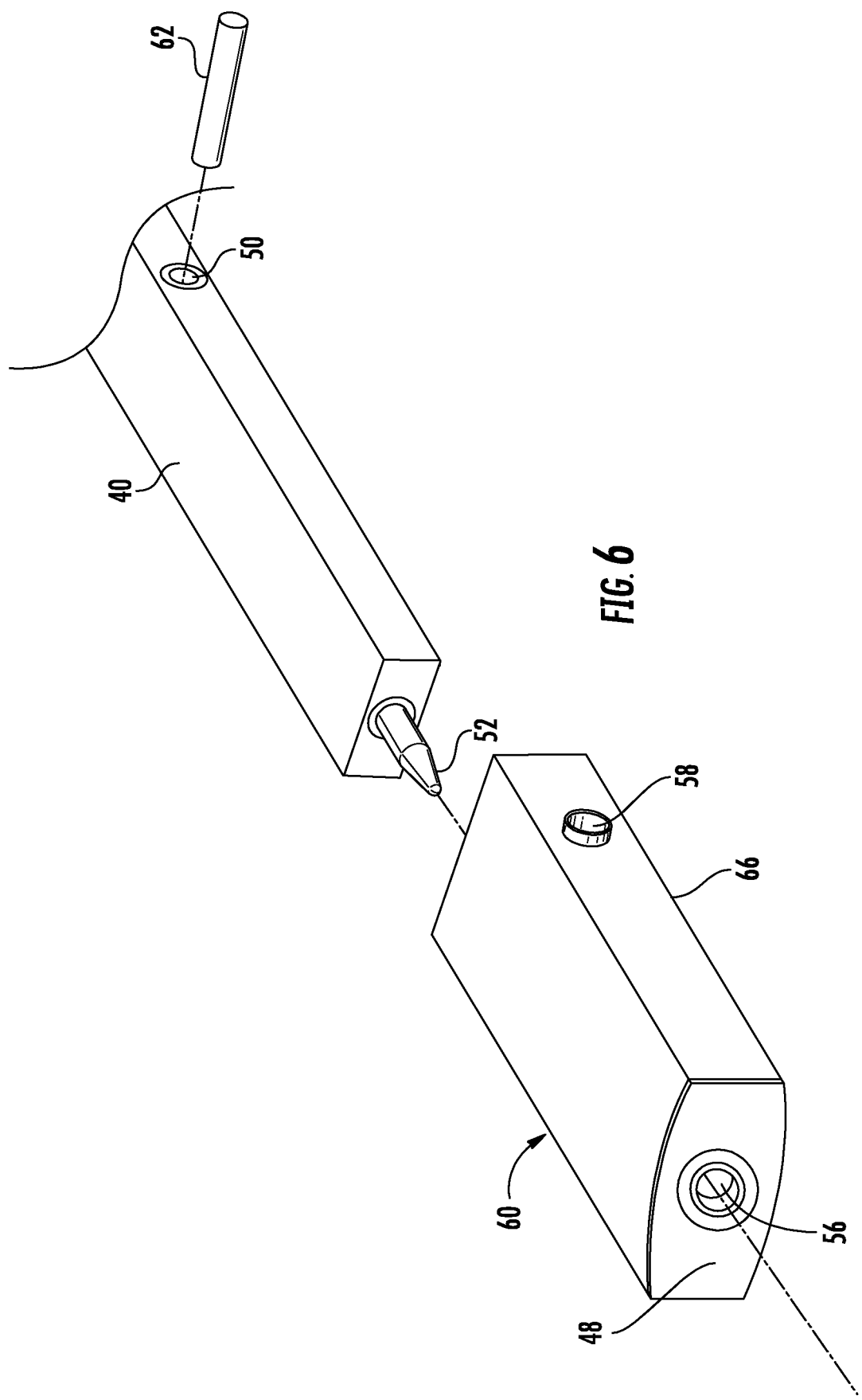
FIG. 6 illustrates an exploded perspective view of one embodiment of the joint assembly of the rotor blade of the wind turbine according to the present disclosure.

Referring now to FIG. 6, an exploded perspective view of the multiple supporting structures of the assembly 70 towards the blade tip of the rotor blade 28 is illustrated. As shown, the receiving section 60 is configured to receive the beam structure 40 and may include the chord-wise second pin joint slot 58 that aligns with the first pin joint slot 50 of the beam structure 40 through which the chord-wise extending pin 62 may be inserted. Further, as shown, the chord-wise extending pin 62 may be configured to remain in a tight interference fit within the aligning pin joint slots 50, 58 such that the receiving section 60 and the beam structure 40 are joined together during assembly. Further, FIG. 6 also illustrates the chord-wise member 48 that includes the radial pin joint slot 56 configured for receiving the pin 52 of the beam structure 40.

Figure 7:
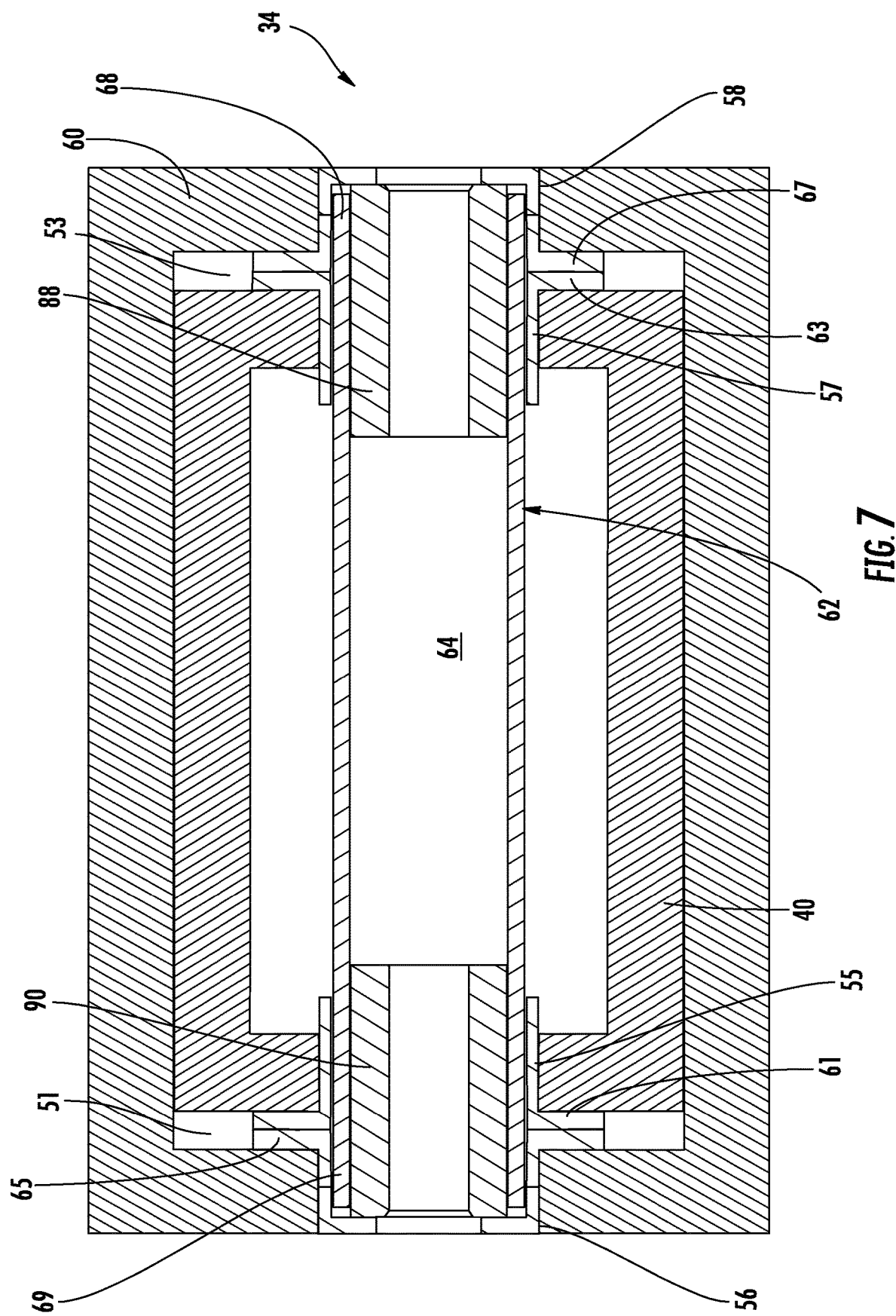
FIG. 7 illustrates a cross-sectional view of the chord-wise joint of FIG. 5 along section line 7-7.

Referring now to FIG. 7, a cross-sectional view of the rotor blade assembly 70 of FIG. 5 is illustrated along line 7-7. More particularly, as shown, the beam structure 40 is received within the receiving section 60. Further, as shown, a leading edge chord-wise gap 51 and a trailing edge chord-wise gap 53 exists between edges of the beam structure 40 and the receiving section 60. In addition, as shown, the chord-wise extending pin 62 is positioned through the chord-wise joint 34 so as to secure the internal support structures 40, 60 of the first and second blade segments 30, 32 together. Moreover, as shown, the first and second pin joint slots 50, 58 of the beam structure 40 and the receiving section 60, respectively, may include a plurality of pairs bushings 55, 56, 57, 58 for receiving the chord-wise extending pin 62 therethrough. For example, as shown, the beam structure 40 and the receiving section 60 may each include a leading edge bushing 56, 55 and a trailing edge bushing 57, 58, respectively, arranged within opposing ends of the first and second pin joint slots 50, 58. In certain embodiments, the various bushings 55, 56, 57, 58 described herein may further include a coating material, e.g. having a coefficient of friction of less than about 0.2.

Referring still to FIG. 7, the chord-wise extending pin 62 may optionally include one or more structural inserts 88, 90 arranged therein. For example, as shown, the chord-wise extending pin 62 may include a first structural insert 88 arranged at the trailing edge end thereof and a second structural insert 90 arranged at the leading edge end thereof. Further, as shown, the structural insert(s) 88, 90 may be aligned with the bushings 55, 56, 57, 58. In particular embodiments, the structural inserts 88, 90 may be steel inserts that are pressed into the pin 62 to provide additional reinforcement in high loading regions.

Figure 8:
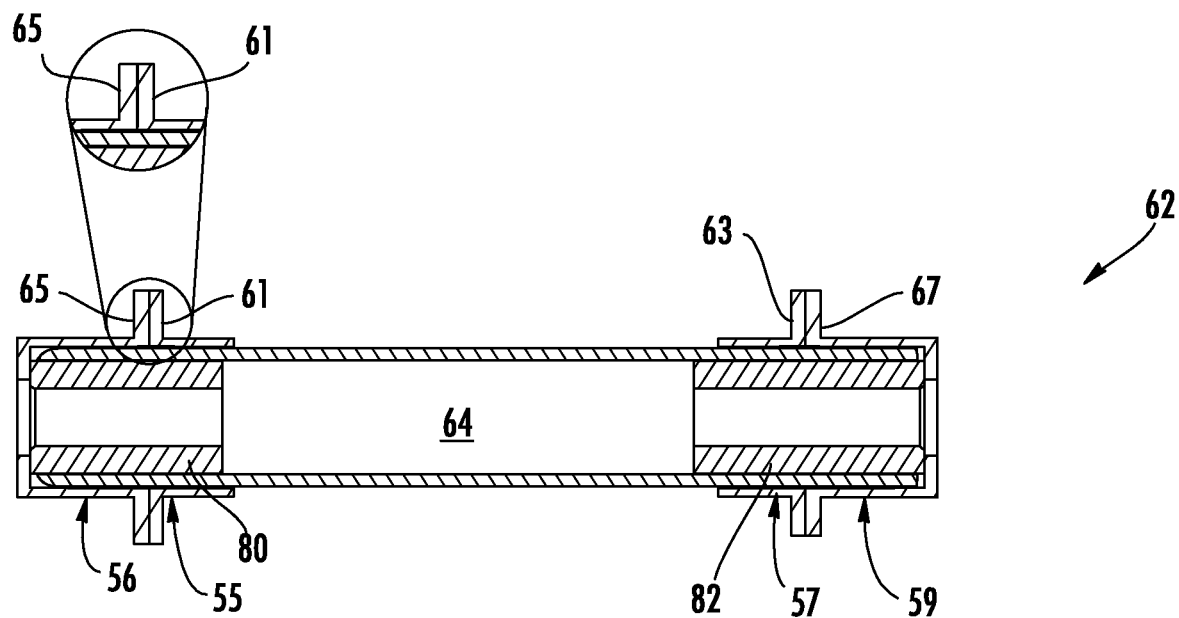
FIG. 8 illustrates a cross-sectional view of one embodiment of a chord-wise extending pin of a chord-wise joint of a rotor blade of a wind turbine according to the present disclosure, particularly illustrating a plurality of flanged bushings arranged at the leading and trailing edges of the pin.

In addition, as shown in FIGS. 7 and 8, each of the bushings 55, 56, 57, 58 may include a flange 61, 63, 65, 67, respectively, two of which are on the leading edge side and two of which are on the trailing edge side of the rotor blade 28. More specifically, as shown, a first bushing 55 may include a flange 61 extending within the chord-wise gap 51 and surrounding the first end of the first pin joint slot 50. Similarly, a second bushing 56 may include a flange 65 extending within the chord-wise gap 51 and surrounding the first end of the second pin joint slot 58. Further, as shown, the flanges 61, 65 of the first and second bushings 55, 56 abut against each other within the chord-wise gap 51 so as to fill the chord-wise gap 51 with a predetermined defined gap or interference. Similarly, on an opposing side of the first and second pin joint slots 50, 58, the rotor blade 28 may include opposing bushings 57, 58 with flanges 63, 67 within another chord-wise gap 63 between the beam structure 40 and the receiving section 60. Thus, as shown, the chord-wise extending pin 62 is positioned through the bushings 55, 56, 57, 58 of the first and second pin joint slots 50, 58 so as to secure the first and second blade segments together 30, 32.

In such embodiments, a chord-wise width of the abutting flanges (i.e. flanges 61 and 63 or flanges 63 and 67) is greater than a chord-wise width of the chord-wise gaps 51, 53 so as create the interference fit. For example, in certain embodiments, the chord-wise width of the abutting flanges may be greater than the chord-wise width of the chord-wise gaps 51, 53 by about 1.5 millimeters (mm). For example, in certain embodiments, the bushings 55, 56, 57, 58 may be constructed of a metal or metal alloy. In such embodiments, the metal or metal alloy may include a material tolerance of about +/−0.025 millimeters (mm) over a 1000 mm span. Thus, as will be discussed herein, the flanges 61, 63, 65, 67 may be machined so as to eliminate some of the interference to ensure a precise fit within the chord-wise gaps 51, 53.

Figure 9A:
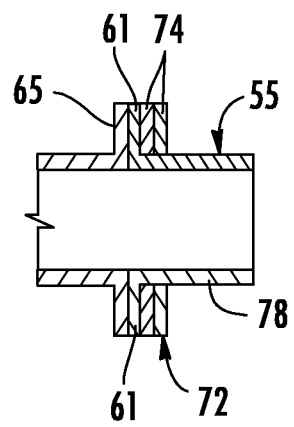
FIG. 9A illustrates a cross-sectional view of abutting flanges of a chord-wise joint of a rotor blade with shims arranged around a shaft of one of the flanges according to the present disclosure.
Figure 9B:
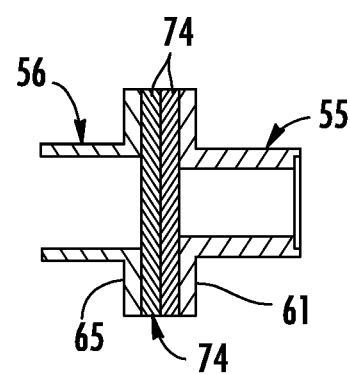
FIG. 9B illustrates a cross-sectional view of abutting flanges of a chord-wise joint of a rotor blade with shims arranged therebetween according to the present disclosure.

Referring now to FIGS. 9A and 9B, rather than the two of the flanges completely filling the chord-wise gaps 51, 53, the chord-wise joint 34 of the rotor blade 28 may include at least one spacer component 72 adjacent to one or more of the flanges 61, 63, 65, 67 of the bushings 55, 56, 57, 58 within the chord-wise gaps 51, 53. In such embodiments, a chord-wise width of the abutting flanges (e.g. flanges 61 and 65) is less than a width of the chord-wise gap 51. Thus, the spacer component(s) 72 is configured to fill the remaining space within the gap 51. For example, as shown in FIGS. 9A and 9B, the spacer component(s) 72 may include one or more shims 74. In such embodiments, the spacer component(s) 72 may be constructed of a metal or metal alloy. As such, the metal or metal alloy generally has a tight material tolerance of about +/−0.025 millimeters (mm) per 1000 mm. In addition, as shown particularly in FIG. 9A, the spacer component(s) 72 may be arranged around a shaft of one or more of the bushings (e.g. the shaft 78 of bushing 55). Alternatively, as shown in FIG. 9B, the spacer component(s) 72 may be arranged between the flanges 61, 65 of the abutting bushings 55, 56. In such embodiments, the shim(s) 74 are configured to fill the remainder of the gap not filled by the abutting flanges. As such, the shim(s) 74 and the flanges 61, 63 completely fill the chord-wise gap 51 (or gap 53).

Referring now to FIGS. 10-12, the spacer component(s) 72 may alternatively be one or more spring-loaded devices 76. More specifically, as shown in FIG. 10, the spring-loaded device 76 may include a conical disk spring 80. Alternatively, as shown in FIG. 11, the spring-loaded device 76 may include a multilayer wave disk spring 82. In yet another embodiment, as shown in FIG. 12, the spring-loaded device 76 may include a rubber viscoelastic ring 84. In such embodiments, as shown, at least a portion of the rubber viscoelastic ring 84 may sit within a recess 86 of at least one of the flanges 61, 65 of the first and second bushings 55, 56. As such, a portion of the rubber is not enclosed, thereby interacting with the opposing bushing face. The rubber viscoelastic ring 84 may be particularly suitable for short compression cycles as its spring rate will eventually become nonlinear and the captured portion of rubber will become exponentially stiff.

Figure 13:
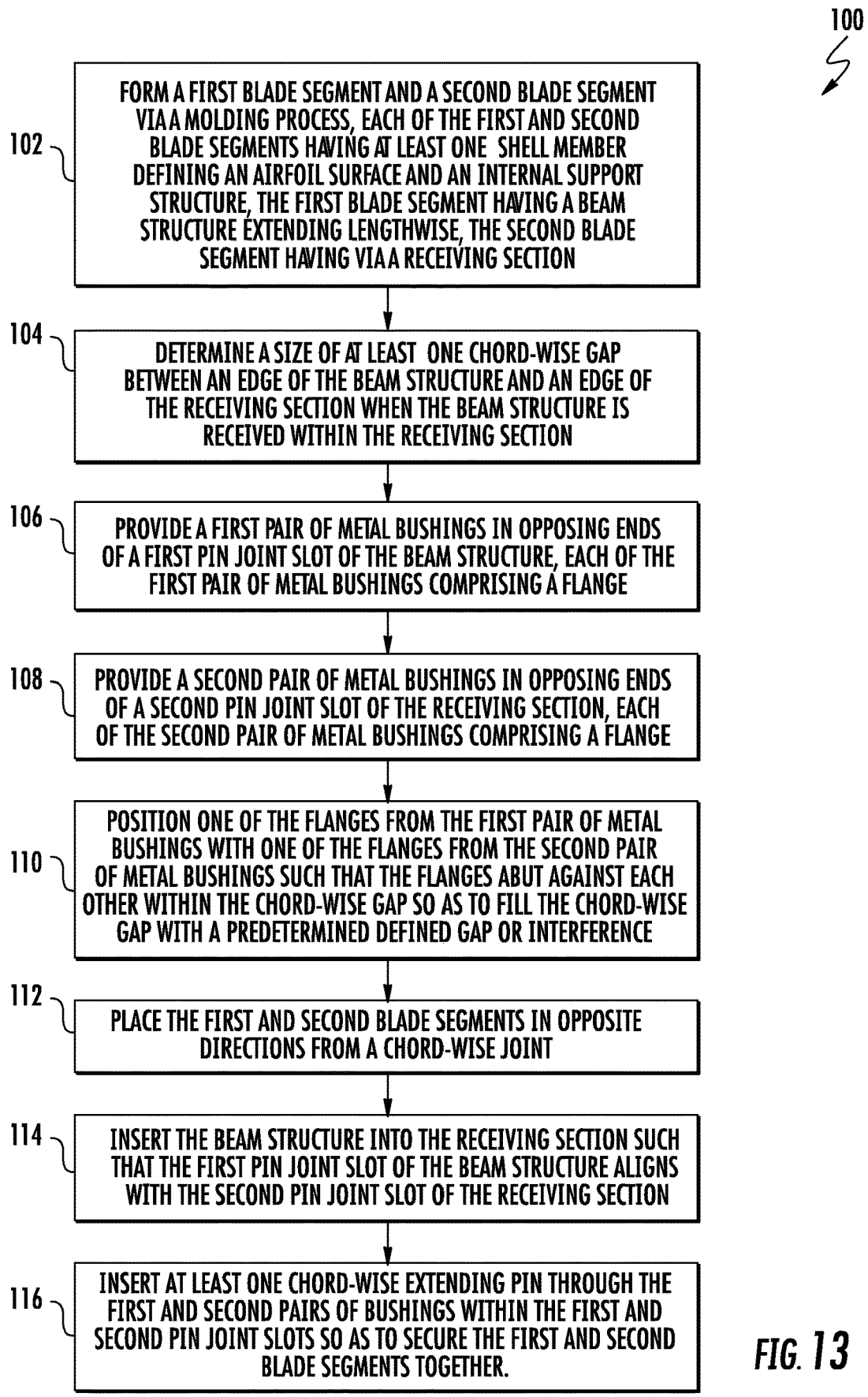
FIG. 13 illustrates a flow chart of one embodiment of a method for assembling a rotor blade according to the present disclosure.

Referring now to FIG. 13, a flow chart 100 of a method for assembling a rotor blade according to the present disclosure is illustrated. In general, the method 100 will be described herein with reference to the wind turbine 10 and the rotor blade 28 shown in FIGS. 1-12. However, it should be appreciated that the disclosed method 100 may be implemented with rotor blades having any other suitable configurations. In addition, although FIG. 13 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include forming the first blade segment 30 and the second blade segment 32 via a molding process. As mentioned, the first blade segment includes the beam structure 40 extending lengthwise, whereas the second blade segment 32 includes the receiving section 60 that receives the beam structure 40. As shown at (104), the method 100 may include determining a size of at least one chord-wise gap between an edge of the beam structure 40 and an edge of the receiving section 60 when the beam structure 40 is received within the receiving section 60. As shown at (106), the method 100 may include providing a first pair of metal bushings 55, 57 in opposing ends of the first pin joint slot 50 of the beam structure 40. As mentioned, each of the first pair of metal bushings 55, 57 has a flange 61, 63. As shown at (108), the method 100 may include providing a second pair of metal bushings 56, 59 in opposing ends of the second pin joint slot 58 of the receiving section 60. As mentioned, each of the second pair of metal bushings 56, 59 also includes a flange 65, 67. Thus, as shown at (110), the method 100 includes positioning one of the flanges 61, 63 from the first pair of metal bushings 55, 57 with one of the flanges 65, 67 from the second pair of metal bushings 56, 59 such that the flanges abut against each other within the chord-wise gap (i.e. gaps 51, 53) so as to fill the chord-wise gap with a predetermined defined gap or interference. As shown at (112), the method 100 may include placing the first and second blade segments 30, 32 in opposite directions from a chord-wise joint 34. As shown at (114), the method 100 may include inserting the beam structure 40 into the receiving section 60 such that the first pin joint slot 50 of the beam structure 40 aligns with the second pin joint slot 58 of the receiving section 60. As shown at (116), the method 100 may include inserting at least one chord-wise extending pin 62 through the first and second pairs of bushings 55, 56, 57, 59 within the first and second pin joint slots 50, 58 so as to secure the first and second blade segments 30, 32 together.

In one embodiment, the size of the chord-wise gaps 61, 63 may be determined after the molding process is complete. In such embodiments, the method 100 may include machining the plurality of flanges 61, 63, 65, 67 of the plurality of metal bushings 55, 56, 57, 59 to remove an interference thereof that is larger than the chord-wise gaps 51, 53.

In another embodiment, providing the first and second pair of metal bushings 55, 57, 56, 58 in opposing ends of the first and second pin joint slots 50, respectively, may further include infusing the first and second pairs of metal bushings 55, 57, 56, 58 in the first and second pin joint slots 50, 58, respectively, such that, when the beam structure 40 is inserted into the receiving section 60, the flanges 61, 63, 65, 67 of the first and second pairs of metal bushings 55, 57, 56, 58 completely fill the chord-wise gap. In such embodiments, the gaps 51, 53 may be avoided altogether by including the bushings in their seats during the infusion process. More specifically, higher precision features in composite molds are configured to register the seat for the bushings through any combination of the following: features in the continuous mold itself, features created by mold inserts (e.g. foam mandrel in a closed mold or bearing block, and/or chord pin insert), features established by co-infused components, bushings infused with composite, tooling to place bushings with precision, and/or tooling to establish critical dimensions (e.g. with between bushing flange interface planes).

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
    a first blade segment and a second blade segment extending in opposite directions from a chord-wise joint, each of the first and second blade segments comprising at least one shell member defining an airfoil surface and an internal support structure, the first blade segment comprising a continuous beam structure extending lengthwise that structurally connects with the second blade segment via a receiving section, wherein the continuous beam structure forms a part of an outermost surface of a shear web of the rotor blade that contacts the at least one shell member of the first blade segment, wherein at least one chord-wise gap exists between an edge of the continuous beam structure and an edge of the receiving section, the continuous beam structure defining a first pin joint slot, the receiving section defining a second pin joint slot that aligns with the first pin joint slot;

a first bushing arranged in a first end of the first pin joint slot, the first bushing comprising a flange extending within the chord-wise gap and surrounding the first end of the first pin joint slot;
a second bushing arranged in a first end of the second pin joint slot, the second bushing comprising a flange extending within the chord-wise gap and surrounding the first end of the second pin joint slot, the second bushing being infused with the second pin joint slot;
at least one spacer component adjacent to one or more of the flanges of the first and second pin joint slots within the chord-wise gap, wherein the at least one spacer component comprises a multilayer wave disk spring; and,
at least one chord-wise extending pin positioned through the first and second bushings of the first and second pin joint slots so as to secure the first and second blade segments together.

2. The rotor blade of claim 1, further comprising a pair of first bushings arranged in the first end of the first pin joint slot and an opposing, second opening of the first pin joint slot, respectively, and a pair of second bushings arranged in the first end of the second pin joint slot and an opposing, second opening of the second pin joint slot, respectively.

3. The rotor blade of claim 2, wherein the chord-wise extending pin is positioned through the pairs of first and second bushings of the first and second pin joint slots so as to secure the first and second blade segments together.

4. The rotor blade of claim 1, wherein the chord-wise gap is located adjacent to a trailing edge and/or a leading edge of the rotor blade.

5. The rotor blade of claim 1, wherein at least one of the first and second bushings comprise a coating material, the coating material comprising a coefficient of friction of less than 0.2.

6. The rotor blade of claim 1, wherein the first and second bushings are constructed of a metal or metal alloy.

7. The rotor blade of claim 6, wherein the metal or metal alloy comprises a material tolerance of +/−0.025 millimeters (mm) over a 1000 mm span.

8. The rotor blade of claim 1, wherein the at least one spacer component is positioned between the flanges of the first and second bushings or arranged around a shaft of one of the first or second bushings.

9. The rotor blade of claim 1, further comprising an insert arranged in the pin and aligned with the first and second bushings.

10. A method for assembling a rotor blade, the method comprising:
forming a first blade segment and a second blade segment via a molding process, each of the first and second blade segments having at least one shell member defining an airfoil surface and an internal support structure, the first blade segment having a continuous beam structure extending lengthwise, wherein the continuous beam structure forms a part of an outermost surface of a shear web of the rotor blade that contacts the at least one shell member of the first blade segment, the second blade segment having via a receiving section;
determining a size of at least one chord-wise gap between an edge of the continuous beam structure and an edge of the receiving section when the continuous beam structure is received within the receiving section;
providing a first pair of metal bushings in opposing ends of a first pin joint slot of the continuous beam structure, each of the first pair of metal bushings comprising a flange;
providing a second pair of metal bushings in opposing ends of a second pin joint slot of the receiving section, each of the second pair of metal bushings comprising a flange, the second pair of metal bushing being infused in the second pin joint slot;
positioning at least one spacer component adjacent to one or more of the flanges of the first and second pin joint slots within the chord-wise gap, wherein the at least one spacer component comprises a conical disk spring or a multilayer wave disk spring;
placing the first and second blade segments in opposite directions from a chord-wise joint;
inserting the continuous beam structure into the receiving section such that the first pin joint slot of the continuous beam structure aligns with the second pin joint slot of the receiving section; and,
inserting at least one chord-wise extending pin through the first and second pairs of bushings within the first and second pin joint slots so as to secure the first and second blade segments together.

11. The method of claim 10, further comprising:
determining the size of the at least one chord-wise gap between the edge of the continuous beam structure and the edge of the receiving section when the continuous beam structure is received within the receiving section after the molding process is complete; and,
machining the plurality of flanges of the plurality of metal bushings to remove an interference thereof that is larger than the chord-wise gap.

12. The method of claim 10, wherein providing the first pair of metal bushings in opposing ends of the first pin joint slot and providing the second pair of metal bushings in opposing ends of the second pin joint slot of the receiving section further comprises:
infusing the first and second pairs of metal bushings in the first and second pin joint slots, respectively, such that, when the continuous beam structure is inserted into the receiving section, the flanges of the first and second pairs of metal bushings and the at least one spacer component completely fill the chord-wise gap.

13. A rotor blade for a wind turbine, comprising:
a first blade segment and a second blade segment extending in opposite directions from a chord-wise joint, each of the first and second blade segments comprising at least one shell member defining an airfoil surface and an internal support structure, the first blade segment comprising a continuous beam structure extending lengthwise that structurally connects with the second blade segment via a receiving section, wherein the continuous beam structure forms a part of an outermost surface of a shear web of the rotor blade that contacts the at least one shell member of the first blade segment, wherein at least one chord-wise gap exists between an edge of the continuous beam structure and an edge of the receiving section, the continuous beam structure defining a first pin joint slot, the receiving section defining a second pin joint slot that aligns with the first pin joint slot;
a first bushing arranged in a first end of the first pin joint slot, the first bushing comprising a flange extending within the chord-wise gap and surrounding the first end of the first pin joint slot;
a second bushing arranged in a first end of the second pin joint slot, the second bushing comprising a flange extending within the chord-wise gap and surrounding the first end of the second pin joint slot;

at least one spacer component adjacent to one or more of the flanges of the first and second pin joint slots within the chord-wise gap, wherein the at least one spacer component comprises a conical disk spring; and, at least one chord-wise extending pin positioned through the first and second bushings of the first and second pin joint slots so as to secure the first and second blade segments together.

14. The rotor blade of claim 13, wherein a chord-wise width of the flanges is less than a width of the chord-wise gap such that the flanges and the at least one spacer component completely fill the chord-wise gap.

15. The rotor blade of claim 13, wherein the at least one spacer component is constructed of a metal or metal alloy, the metal or metal alloy comprising a material tolerance of +/−0.025 millimeters (mm).

16. The rotor blade of claim 13, wherein the at least one spacer component is positioned between the flanges of the first and second bushings or arranged around a shaft of one of the first or second bushings.

17. The rotor blade of claim 13, wherein at least one of the first and second bushings comprise a coating material, the coating material comprising a coefficient of friction of less than 0.2.

* * * * *